Nov. 30, 1943.  A. W. KEEN  2,335,339
FOAM HOMOGENIZER
Filed Oct. 16, 1941  2 Sheets-Sheet 1
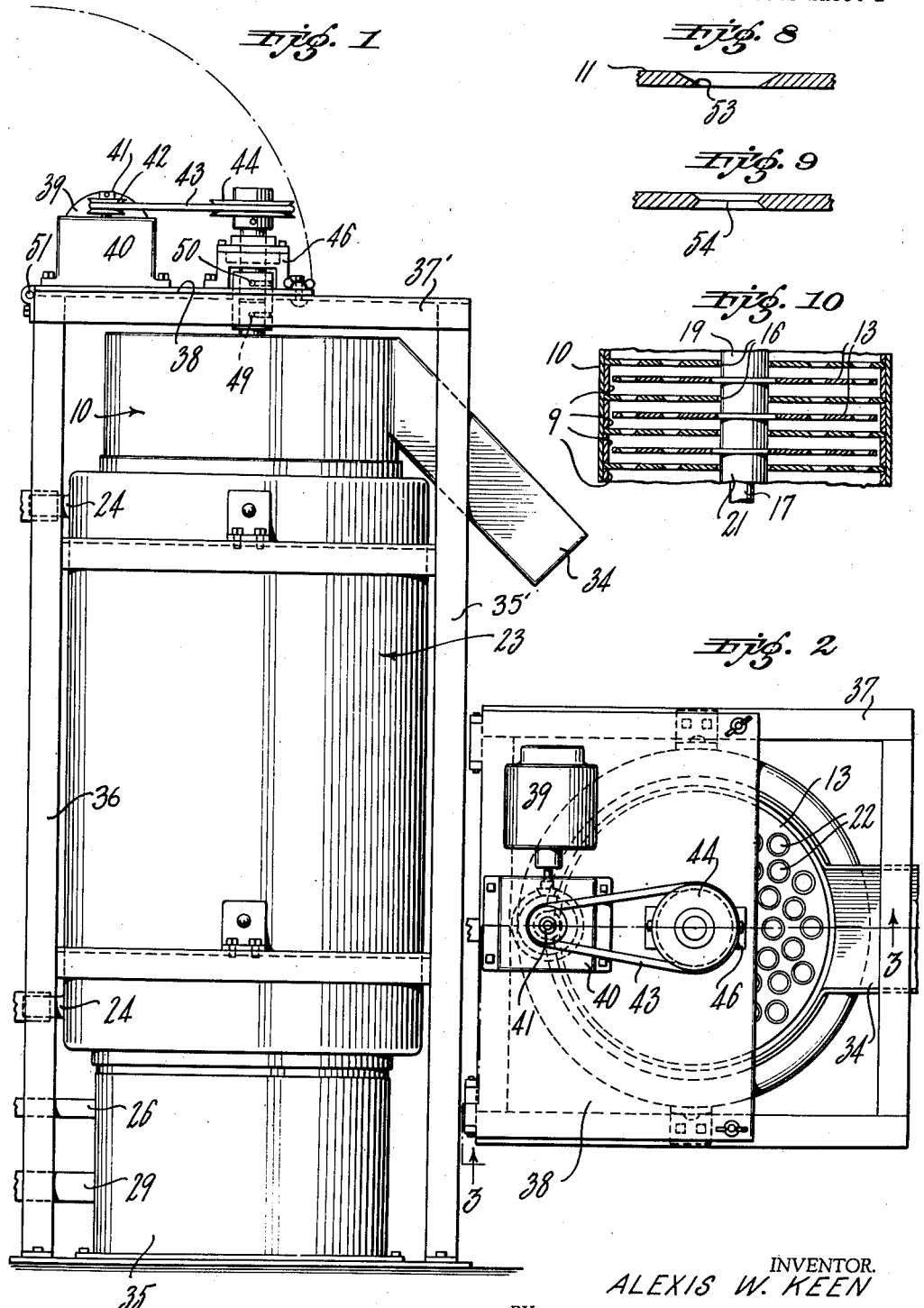
INVENTOR.
ALEXIS W. KEEN
BY
ATTORNEY Nov. 30, 1943.                A. W. KEEN                  2,335,339
                            FOAM HOMOGENIZER
                          Filed Oct. 16, 1941              2 Sheets-Sheet 2
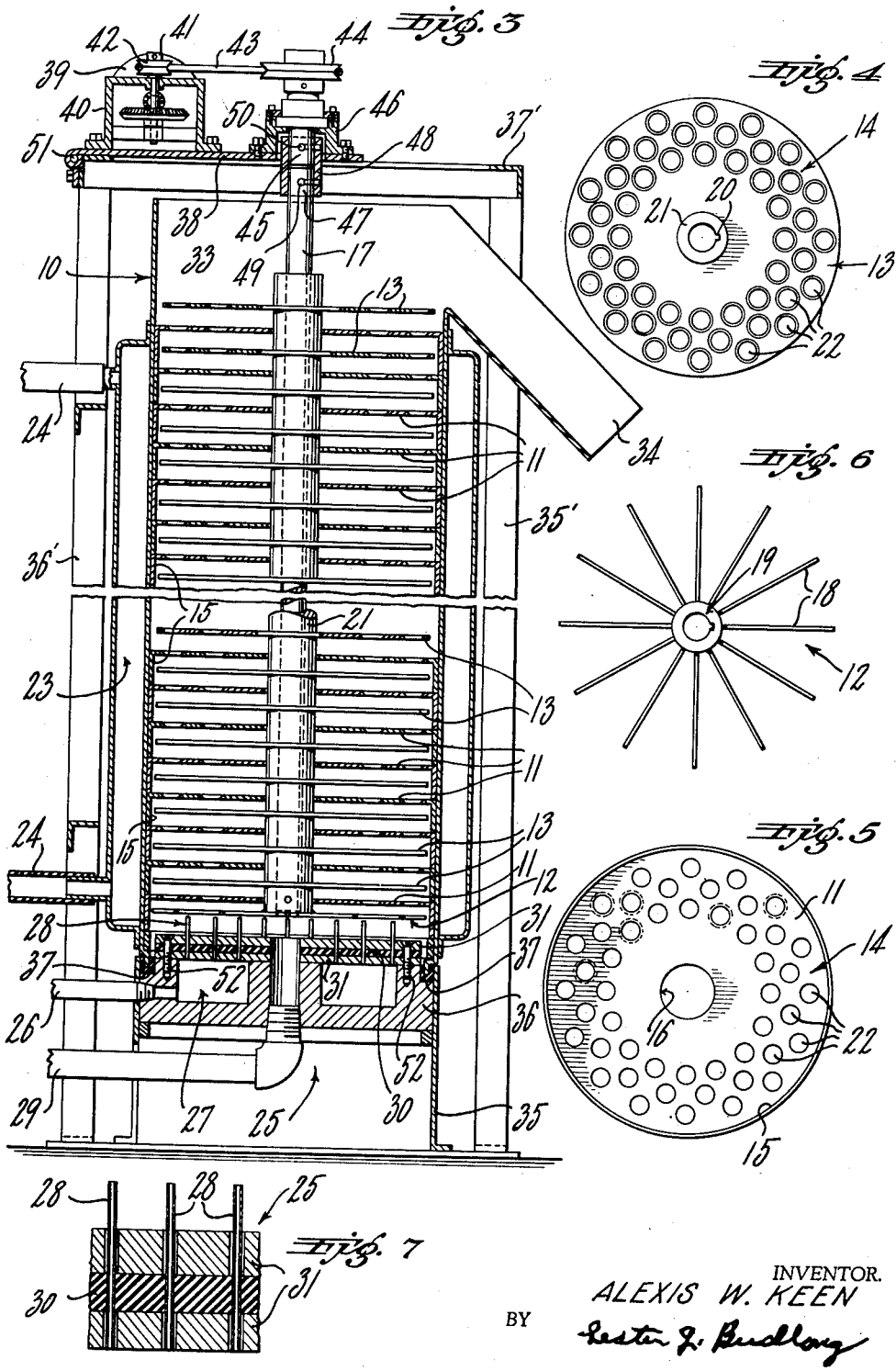
INVENTOR.
ALEXIS W. KEEN
BY
Lester J. Budlong
ATTORNEY Patented Nov. 30, 1943

2,335,339

UNITED STATES PATENT OFFICE 2,335,339

FOAM HOMOGENIZER

Alexis W. Keen, Packanack Lake, N. J., assignor to United States Rubber Company, New York, N. Y., a corporation of New Jersey Application October 16, 1941, Serial No. 415,161

6 Claims. (Cl. 261—93)

This invention relates to an improved apparatus for the production of fine foam by continuously subdividing foam-cells in a moving body of a relatively coarse foam. The present apparatus is particularly adapted to making foam of rubber latex and is an improvement upon that disclosed in my Patent 2,295,740. In my earlier apparatus air is injected just beneath the surface of a body of liquid by a large number of minute nozzles or hollow needles distributed over the area of a foaming chamber. As the air emerges from the tips of the needles at the surface of the liquid it forms foam cells each consisting of a thin film of liquid inflated with air. These relatively coarse cells are sheared into smaller cells by being passed between a rotating cylindrical or conical continuous smooth surface and a similar coaxial stationary surface. The relative motion of the two surfaces shears the cells and sub-divides them progressively into smaller cells as they pass axially along the space between the surfaces.

While my earlier apparatus produces foam which is satisfactory from a number of standpoints, the apparatus has several disadvantages. In the initial shearing some of the cells are broken and coalesce into large cells or air pockets. These large cells or pockets pass through the plain surface type of shearing device without sub-division and escape from the foam mass as free air. Uniform flow, efficiency and density are adversely affected. The indeterminate amount of air which escapes in this way makes the maintenance of density control extremely difficult. Continual sampling and adjustments are necessary to control the density of the foam. Also, since the amount of air escaping depends on the rate of shearing, it is often impossible to regulate the foam texture (size of cells) without also affecting the density (relative amounts of air and liquid).

The present invention removes these disadvantages and objections, providing a foaming apparatus which incorporates all of the air into the foam in the form of very small cells, and which accurately controls both the density and texture of the foam independently of one another. In general, this is accomplished by an improved form of shearing means combined with slicing means for slicing any cells too large to be sheared, and by requiring all of the foam to pass through the shearing and slicing means.

In the present improved apparatus the slicing and shearing mechanism consists of a series of alternate coaxial perforate rotors and stators. Both rotors and stators consist of circular slicing and shearing elements having perforate annular areas. Such elements are in the form of suitable surfaces of revolution such as discs or cones, discs being preferred as illustrated herein. The edges of the perforations form the slicing devices, as will be explained. The stators are mounted within a cylindrical housing, and the rotors are attached to a common shaft in such a manner that the perforate areas in the rotors and stators provide the sole path through which the coarse foam may pass upwardly through the shearing chamber. Thus all of the foam must pass through the slicing means. The clearance between adjacent rotors and stators is relatively coarse, many times the average diameter of the cells in the finished foams.

The new structure results in several advantages not possessed by my earlier apparatus. By requiring all the foam to pass through a succession of perforate discs mounted horizontally, accumulations of air resulting from the inevitable breaking of some of the coarse cells are alternately sliced and sheared to the fine texture foam desired.

Other features and objects of the invention will appear as the description of the preferred embodiment selected for illustration and description proceeds.

In the accompanying drawings, like reference characters are applied to corresponding parts throughout the several views which make up the drawings, in which:

Fig. 1 is a view in side elevation of a frother in the construction of which the improvements forming the subject of the present invention have been embodied;

Fig. 2 is a view in plan of the apparatus shown in Fig. 1;

Fig. 3 is a view in vertical section taken on the line 3—3 of Fig. 2;

Fig. 4 is a plan view of a rotor element, removed from the assembly of Fig. 3;

Fig. 5 shows in plan a stator element, also removed from the assembly of Fig. 3;

Fig. 6 is a plan view of another type of rotor, also shown apart from the assembly of Fig. 3;

Fig. 7 is a fragmentary detail view in vertical section of a portion of the air feeding structure;

Fig. 8 is a fragmentary detail view in vertical section of part of a shearing element;

Fig. 9 is a similar view of a modification; and

Fig. 10 is a similar view of a modified form of spacing means.

Details of the invention may be understood clearly by reference to the drawings. The foamer proper consists of a cylindrical housing 10 in which are mounted alternate stators 11 and rotors 12 and 13. Each stator 11 consists of a smooth planar disc having a perforated annular area 14 surrounding an imperforate central zone (see Fig. 5). In a preferred embodiment, the lowermost stator has an edge, or rim, 15, which is cylindrical and has a proper height to maintain the correct spacing of the two lower stators. Other stators may be spaced apart as in Fig. 10 by separately formed rings 9, of suitable height. Each of the stators has in its center a circular hole 16, which is large enough to clear the hubs 19 and 21 on rotors 12 and 13 (see Figs. 4 and 6).

On the shaft 17 are assembled the rotors, designated respectively by the reference characters 12 and 13. Rotor 12 is made preferably of arms 18 taking the form of a spider mounted radially about a center hub 19, which is keyed onto the shaft 17. In the drawing one such spider is shown, although more may be added. It is entirely possible to replace spider rotor 12 with a perforate disc rotor 13. The rotors 13 are smooth, planar discs, and each is provided with a perforated annular area or zone 14 surrounding an imperforate zone, like that already described briefly with reference to the stators. The rotors 13 are also each provided with a central hub 21 keyed to the shaft 17, as provided for at 20 (Fig. 4). Perforations 22 in the stators and in the circular disc rotors preferably take the form of circular holes, and it has been found that these perforations should each be approximately ¼ inch in diameter.

In assembling the apparatus, the alternate rotors and stators are slipped over the shaft 17 until the stack of rotors and stators is completed. The spacing rims 15 or the spacers 9 (see Fig. 10) between the stators then form a sort of cylinder, and the whole assembly can be slid into the outer cylinder 10. The latter is provided with a surrounding water jacket 23 having inlet and outlet connections 24. In the lower end of the foaming cylinder is an aerating unit 25 (see Fig. 3). An air inlet 26 communicates through a distributing chamber 27 in the base with a series of small hypodermic needles 28 (Figs. 3 and 7). Latex is supplied through the conduit 29. Air admitted through the needles forms coarse globules in the latex. The needles may be held resiliently by a layer of rubbery material 30 clamped between plates 31 of relatively inflexible material as disclosed and claimed in my aforesaid patent.

The reference character 35 designates a hollow sheet metal base provided with a cast metal plug 36 around which a joint is formed as at 37 with cylinder 10.

In using the apparatus above illustrated to produce latex foam, measured amounts of latex and air are introduced continuously through the inlets 29 and 26 respectively. At the same time the shaft 17 is rotated at a suitable speed, which may be varied considerably without affecting the operation of the apparatus, but it is preferred to have the speed such that the linear velocity of the periphery of the rotating discs is of the order of 100 feet per minute.

The air introduced through inlet 26, issues from the tips of the hypodermic needles 28. The spider 12 is mounted as close as is practical to the tips of the needles 28, as shown in Fig. 1. Thus as it rotates the arms 18 intermittently pass very close to the air orifices. This helps to break up the streams of incoming air into relatively coarse globules, which as they emerge from the surface of the liquid form coarse foam. The coarse foam then passes upwardly through the succession of perforate rotors 12 and stators 11.

In passing through the spaces between the rotors and stators, the cells in the coarse foam are subjected successively to shearing stresses with the result that they are subdivided and reduced in size, and any larger cells which may be formed by combining of two or more smaller cells, are sliced by the edges of the discs while the foam is passing through the holes and are reincorporated ultimately into the foam in the form of smaller cells. The construction of the frother thus makes it impossible for such larger cells to escape from the frother. The final foam, which is of essentially uniformly fine cell size, emerges from the outlet chamber 33, above the shearing chamber, through the delivery spout or tube 34 whence it may be poured into molds, etc., for the production of sponge rubber articles.

The present apparatus has several advantages over the smooth cylinder type homogenizer forming the subject matter of my earlier application above mentioned. First, since all of the air introduced into it is effective in forming foam, the density of the final foam depends solely upon the relative rates at which air and latex are fed to the apparatus and is independent of changes in the physical properties of the latex compound. This means that by the use of this homogenizer it is not necessary to carry out frequent measurements of foam density, and it is therefore possible, by providing proper automatic proportioning controls for the air and latex feeds, to operate a continuous foaming process which is entirely automatic. Since the present design is more efficient in its shearing action than the cylinder homogenizer, it is possible to increase the rate of foam production without an adverse effect on foam density, and with a resulting saving in the cost of operation.

The following data will give some idea of the tested performance of a latex frother embodying the present invention, as compared with one embodying the rotating cylinder homogenizer. The test of the improved homogenizer was made on an apparatus like that shown in the attached drawing. In this apparatus the shearing chamber was a cylinder approximately 18 inches long and 4 inches in diameter. There were in all a total of thirty-five stators and thirty-six rotors. Four of the latter were of the spider type designated 12 in the drawing, and the remaining thirty-two were of the perforate disc type, as shown at 13 in the drawing, each stator and each disc rotor being made from sheet metal $\frac{3}{32}$ inch thick, and perforated with a total of forty-seven ¼-inch holes located in a zone of annular shape having an inner diameter of approximately two inches, and an outer diameter of 3¾ inches. The distance between successive stator faces was of the order of ½ inch.

The support for the shaft 17 bearing the assembled rotors was adjusted so that the rotors were located approximately midway between adjacent stators. The matter of clearance between the rotors and stators is not critical, providing the clearance is kept within suitable limits. This particular apparatus has been operated with as low as $\frac{1}{16}$ inch clearance between each rotor and the nearest stator with no observable change in its operation by reason of such a clearance. In general, it is not desirable to have the clearance too small, as variations in position of the rotors resulting from end play in the supporting-shaft might cause the apparatus to jam. Too small a clearance may also cause coagulation of latex between a rotor and the adjacent stator, due to frictional effects. For practical reasons, 1/16 inch may be taken as about the lowest desirable clearance, with between 1/8 inch and 1/4 inch as the preferred value. The foams produced range in cell diameter from about 0.5 millimeter to 1 millimeter.

With a standard latex sponge compound which is fairly easy to foam, the above sized perforate-disc foam-homogenizer will produce, on the average, 100 gallons per hour of foam having an apparent density of 0.120 gram per cubic centimeter. With the same latex, and under the same conditions, the rotating cylinder apparatus will produce a somewhat smaller quantity per hour, altho the capacity of the cylinder apparatus is considerably above any of the previously known foaming devices. In the case of the perforate disc apparatus, the density of the finished foam is the same as that calculated from a knowledge of the relative amounts of air and latex fed into the apparatus in a given period of time, whereas, with the rotating cylinder apparatus, the density will always be greater than the calculated density, indicating a loss of air, and the discrepancy will be found to vary, depending upon the compound used or the speed of operation of the apparatus.

The superiority of the perforate disc apparatus becomes particularly marked when it is desired to produce foam from compounds which are inherently difficult to foam. For example, with one latex compound which contained a large amount of filler, it was impossible, using the rotating cylinder apparatus, to prepare a foam having an apparent density of less than 0.175 gm. per cc. The same compound, used in the perforated disc apparatus, gave a foam having an apparent density of 0.057 gm. per cc.

From the foregoing, it will be gathered readily that the improved homogenizer has a higher capacity and greater efficiency than the prior apparatus.

In addition the apparatus is much more compact. The disc form of shearing surfaces greatly reduces the ratio of machine volume to shearing area.

The construction is such that the apparatus can very easily be taken down for cleaning. This is an important feature of an apparatus in which latex is to be subjected to mechanical action. The general construction, and the fact that the rotor-stator clearances are large and not critical, makes the reassembly of the apparatus very simple.

It should also be apparent that, while the preceding discussion has been particularly directed to an apparatus comprising apertured circular discs as the elements, these elements may comprise apertured conical members or a similar structure without departing from the principle of the invention.

In providing for easily assembled and disassembled structural elements, in my improved apparatus, in order to carry into effect that feature of the invention, any suitable structural elements constructed and arranged to cooperate with the stators and rotors may be provided, and in pursuance of this object of the invention use may be made to advantage of a supporting structure which, as illustrated in Figs. 1, 2 and 3, comprises uprights 35' and 36', an overhead framework 37', and a swinging platform 38.

On the platform are mounted a motor 39, with a gear box 40 including a driving shaft 41 having a pulley 42 from which a belt 43 runs to a pulley 44 on a countershaft 45 disposed in vertical alignment with the upper end 47 of the foamer shaft 17, being mounted in a suitable thrust bearing 46 supported by the platform 38.

A slidable coupling sleeve 48 is secured, by easily removable pins 49 and 50, to the aligned shaft parts 45 and 47 respectively, and when these parts are in the connected position illustrated in Fig. 3, the shaft 17 and rotors 13 and 12 will be driven as a unit relatively to the stators 11, applying therebetween the desired shearing action to the foam passing upward from the needles 28. It is to be noted that the perforations 22 constitute the sole effective path for the transfer of foam past each disc, and the success of the improved apparatus is considered to be attributable in very large part to this structure.

When it is desired to remove the stack of combined stators 11 and rotors 12, 13, the pins 49, 50 may be withdrawn from the coupling sleeve 48, and the latter slipped down over the shaft end 47; and then the platform 38 may be swung back on its hinges 51, clearing the way for the stator-rotor assembly to be raised out of the cylinder 10.

The rotors and stators may then be inspected while on the shaft 17, and may, if desirable, be removed therefrom individually for adjustment, repairs and replacement, without disturbing the cylinder 10, which may be left in place with its associated parts, including the jacket 23 and the air-needle group 31—32, the latter being freely visible at the bottom of the cylinder 10.

If desirable, however, the ducts 24 may be disconnected at such times, and the jacket 23 and cylinder 10 removed, simply by lifting them upward and then laterally, from the base-plug 36. The needles 28 may then be examined in detail, and serviced, or repaired and replaced individually, as need may arise, and the needle assembly may be freed by unloosing the bolts 52, which permits the needle assembly to be removed as a unit. Figs. 8 and 9 illustrate modified configurations for the perforations in the discs. In Fig. 8 the wall 53 of the perforation is inclined, and hence forms a single bevel. In Fig. 9 the wall has a double bevel providing a relatively sharp medial ridge 54. The bevels produce sharp edges which assist the slicing of large cells without breaking them, particularly if the discs are thick.

From the foregoing, it will be understood readily that the frother structure may be erected originally, and reerected from time to time, as required, by assembling its component parts in a series of steps which are simply the reverse of the steps of disassembly last above recounted.

In practical use of the improvements herein disclosed, it is found that the apparatus produces a foam of fine and uniform texture, and that the densities can be controlled exactly because the air is entirely absorbed by the latex, so that, by varying the relative proportions of air and latex, the density can be easily and rapidly varied to suit current needs of production.

While the improvements herein disclosed are of particular utility when embodied in a homogenizer for producing latex foam, it is to be understood that I contemplate the employment of my invention in any field for use in which it is adapted by the nature of my improvements.

Having thus described my invention, what I claim and desire to protect by Letters Patent is:

1. Foam producing apparatus comprising a foaming chamber, means for introducing gas as globules into a foamable liquid within said chamber, said means comprising a gas supply connection and a plurality of capillary nozzles associated therewith and extending into said chamber and distributed over the entire area of the cross-section of the chamber, and shearing means within said chamber comprising a rotor including a support provided with elements shaped as surfaces of revolution and having opposed transversely disposed shear-producing surfaces defining spaces therebetween, and a stator provided with elements shaped like the rotors and having complemental shear-producing surfaces extending into said spaces and to said support, the spaces between adjacent elements being unobstructed, said elements having perforations therethrough and the sole effective path for the transfer of foam through said chamber being through the perforations.

2. Apparatus for foaming liquids comprising in combination a cylindrical foaming chamber, means for introducing foamable liquids and gaseous foaming medium at one end of the chamber, a rotatable member mounted coaxially of said chamber, a plurality of spaced perforated stationary shearing partitions mounted within said chamber and extending from the wall thereof substantially to said rotatable member to obstruct passage through said chamber except through the perforations in said partitions, each partition being in the form of a surface of revolution, a plurality of spaced perforated shearing elements shaped like the partitions and mounted on said rotatable member and intercalated between the partitions, the spaces between adjacent partitions and shearing elements being unobstructed, and the shearing elements extending from the rotatable member substantially to the wall of the chamber to obstruct passage between the perforations of adjacent partitions except through the perforations in the shearing elements and means to rotate the rotatable member while foam is passing through the chamber to shear the foam while passing between the shearing elements and partitions.

3. Apparatus for foaming liquids comprising in combination a cylindrical foaming chamber, means for introducing foamable liquid and gaseous foaming medium at one end of the chamber, a rotatable member mounted coaxially of the chamber, a plurality of stationary shearing partitions mounted within the chamber, each partition being in the form of a surface of revolution and having substantially uniform perforations therethrough, said partitions extending from the wall of the chamber substantially to said rotatable member to obstruct passage through said chamber except through said perforations, a plurality of spaced shearing elements shaped like the partitions and mounted on said rotatable member and intercalated between the partitions, said shearing elements having substantially uniform perforations there-through substantially the same size as the perforations in the partitions, the spaces between adjacent partitions and shearing elements being unobstructed and said shearing elements extending from the rotatable member substantially to the wall of the chamber to obstruct passage between adjacent partitions except through the perforations in the shearing elements, the spacing between adjacent shearing elements and partitions being substantially equal to the size of the perforations, and means to rotate the rotatable member while foam is passing through the chamber to shear the foam while passing between the shearing elements and partitions.

4. Apparatus for foaming liquids comprising in combination a cylindrical foaming chamber, means for introducing foamable liquid at one end of the chamber, means including a plurality of minute openings distributed substantially throughout the cross-section of the chamber for introducing gaseous foaming medium into the liquid, a rotatable member mounted coaxially of the chamber, a plurality of spaced perforated stationary shearing partitions mounted within said chamber, each of said partitions being in the form of a surface of revolution and extending from the wall thereof substantially to said rotatable member to obstruct passage through said chamber except through the perforations in said partitions, a plurality of spaced perforated shearing elements shaped like the partitions and mounted on said rotatable member and intercalated between the partitions, the spaces between adjacent partitions and shearing elements being unobstructed, said shearing elements extending from the rotatable member substantially to the wall of the chamber to obstruct passage between the perforations of adjacent partitions except through the perforations in the shearing elements and means to rotate the rotatable member while foam is passing through the chamber to shear the foam while passing between the shearing elements and partitions.

5. In a foam producing apparatus, a cylindrical foaming chamber having mounted therein a shearing device comprising a rotatable support, a spaced series of perforated shearing rotors assembled on said support, each of said rotors being shaped as a surface of revolution whose axis is the axis of the support, and a spaced series of perforated shearing stators shaped like the rotors and disposed within the cylinder and extending to said support between adjacent rotors, the spaces between adjacent rotors and stators being unobstructed and the sole effective path for transfer of foam through said chambers being through the perforations.

6. In a foam producing apparatus, a cylindrical foaming chamber having mounted therein a shearing device comprising a rotatable support, a spaced series of shearing rotors assembled on said support, each of said rotors being shaped as a surface of revolution whose axis is the axis of the support, and a spaced series of shearing stators shaped like the rotors and disposed within the cylinder and extending to said support between adjacent rotors, the spaces between adjacent stators and rotors being unobstructed and the rotors and stators having perforated peripheral zones and imperforate inner zones and preventing passage through the chamber except through the perforations.

ALEXIS W. KEEN.